US008699509B2

(12) United States Patent  
Chin et al.

(10) Patent No.: US 8,699,509 B2  
(45) Date of Patent: Apr. 15, 2014

(54) METHODS AND SYSTEMS FOR DIVERSITY IDLE MODE IN A MOBILE STATION

(75) Inventors: Tom Chin, San Diego, CA (US); Kuo-Chun Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 888 days.

(21) Appl. No.: 12/260,354

(22) Filed: Oct. 29, 2008

(65) Prior Publication Data

US 2010/0103848 A1 Apr. 29, 2010

(51) Int. Cl.
*H04W 4/00* (2009.01)
*H04L 12/403* (2006.01)
*H04B 7/00* (2006.01)

(52) U.S. Cl.
USPC .................. 370/449; 370/322; 455/515

(58) Field of Classification Search
USPC ......... 370/254, 311, 312, 331, 332, 449, 457; 455/522, 524, 436, 437, 440, 515
See application file for complete search history.

(56) References Cited

U.S. PATENT DOCUMENTS

| 7,966,017 | B2 * | 6/2011 | Kim et al. ..................... 455/436 |
|---|---|---|---|
| 2002/0006805 | A1 * | 1/2002 | New et al. ..................... 455/525 |
| 2005/0048982 | A1 | 3/2005 | Roland et al. |
| 2005/0070340 | A1 * | 3/2005 | Kim .............................. 455/574 |
| 2005/0128990 | A1 * | 6/2005 | Eom et al. ..................... 370/338 |
| 2007/0202871 | A1 * | 8/2007 | Altshuller et al. ............. 455/428 |
| 2008/0031160 | A1 * | 2/2008 | Ryu et al. ...................... 370/259 |
| 2008/0045145 | A1 * | 2/2008 | Nakatsugawa ............... 455/11.1 |
| 2008/0175180 | A1 * | 7/2008 | Kim .............................. 370/311 |

FOREIGN PATENT DOCUMENTS

| CN | 1602013 A | 3/2005 |
|---|---|---|
| JP | 2008508779 A | 3/2008 |
| JP | 2008524956 A | 7/2008 |
| WO | WO0207459 A2 | 1/2002 |
| WO | WO2006011775 | 2/2006 |

OTHER PUBLICATIONS

International Search Report & Written Opinion—PCT/US2009/061099 International Search Authority—European Patent Office—Mar. 1, 2010.

* cited by examiner

*Primary Examiner* — Redentor Pasia
(74) *Attorney, Agent, or Firm* — Tyler J. Overall

(57) ABSTRACT

A mobile station (MS) of a wireless communications system monitors the paging messages of a serving base station (BS) as well as paging messages of one or more neighboring BSs with sufficient signal strength or signal quality. The MS monitors for paging messages from a set of BSs including the serving BS and the neighboring BSs, during listening intervals. The MS coordinates the listening intervals with the paging intervals of the paging messages. These and other aspects related to monitoring the paging intervals of multiple BSs may help improve paging success rate.

28 Claims, 9 Drawing Sheets

PAGING CYCLE DOUBLED IN HO REGION

Traditional Paging Cycle

> US 8,699,509 B2

METHODS AND SYSTEMS FOR DIVERSITY IDLE MODE IN A MOBILE STATION

TECHNICAL FIELD

Certain embodiments of the present disclosure generally relate to wireless communication and, more particularly, to idle mode handoff procedures.

SUMMARY

Certain embodiments provide a method for monitoring for paging messages by a mobile station in an idle mode in which components are powered down during paging unavailable windows. The method generally includes maintaining a page monitoring set of base stations to monitor for paging messages and monitoring for paging messages from base stations in the page monitoring set during listening intervals of the idle mode, the listening intervals coordinated with paging intervals of the base stations in the page monitoring set.

Certain embodiments provide an apparatus for monitoring for paging messages by a mobile station in an idle mode in which components are powered down during paging unavailable windows. The apparatus generally includes logic for maintaining a page monitoring set of base stations to monitor for paging messages and logic for monitoring for paging messages from base stations in the page monitoring set during listening intervals of the idle mode, the listening intervals coordinated with paging intervals of the base stations in the page monitoring set.

Certain embodiments provide an apparatus for monitoring for paging messages by a mobile station in an idle mode in which components are powered down during paging unavailable windows. The apparatus generally includes means for maintaining a page monitoring set of base stations to monitor for paging messages and means for monitoring for paging messages from base stations in the page monitoring set during listening intervals of the idle mode, the listening intervals coordinated with paging intervals of the base stations in the page monitoring set.

Certain embodiments provide a computer-program product for monitoring for paging messages by a mobile station in an idle mode in which components are powered down during paging unavailable windows, comprising a computer readable medium having instructions stored thereon, the instructions being executable by one or more processors. The instructions generally include instructions for maintaining a page monitoring set of base stations to monitor for paging messages and instructions for monitoring for paging messages from base stations in the page monitoring set during listening intervals of the idle mode, the listening intervals coordinated with paging intervals of the base stations in the page monitoring set.

In certain embodiments, as disclosed herein, base station(s) can communicate in accordance with one or more standards of the Institute of Electrical and Electronics Engineers (IEEE) 802.16 family of standards.

BRIEF DESCRIPTION OF THE DRAWINGS

So that the manner in which the above-recited features of the present disclosure can be understood in detail, a more particular description, briefly summarized above, may be had by reference to embodiments, some of which are illustrated in the appended drawings. It is to be noted, however, that the appended drawings illustrate only certain typical embodiments of this disclosure and are therefore not to be considered limiting of its scope, for the description may admit to other equally effective embodiments.

DETAILED DESCRIPTION

Figure 1:
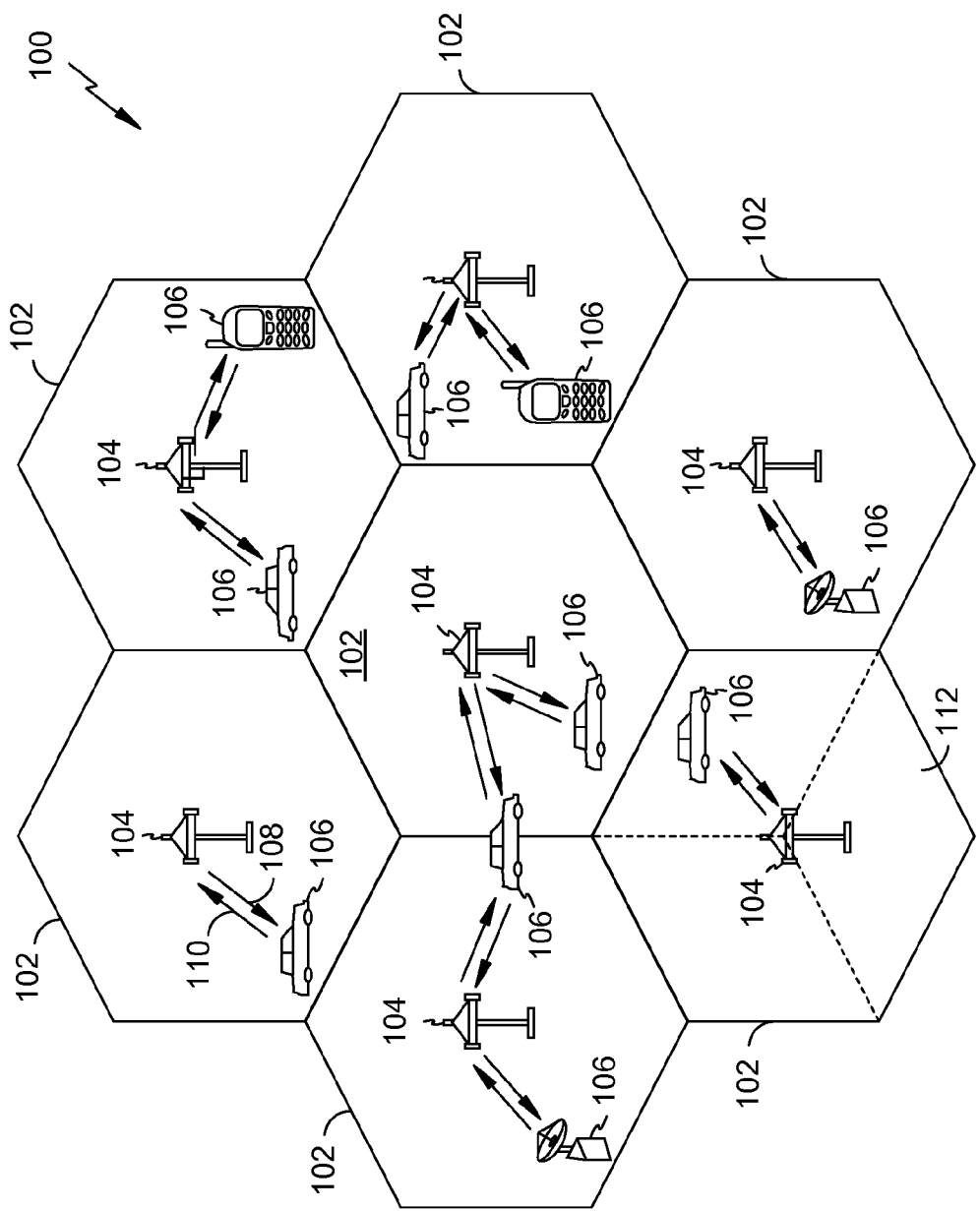
FIG. 1 illustrates an example wireless communication system, in accordance with certain embodiments of the present disclosure.

Mobile WiMAX standards define an idle mode during which a mobile station (MS) may power down components in an effort to conserve power. In the idle mode, the MS powers up components to monitor for page messages in recurring MS Paging Listening ("listening") intervals, while powering down components in MS Paging Unavailable ("sleep") intervals.

In a mobile WiMAX network, each WiMAX frame has a 24-bit frame number that increments every frame until the maximum is reached before restarting from zero. This frame number can be used to decide when a Base Station (BS) should send a BS Broadcast Paging (MOB_PAG-ADV) message, at some Paging_Offset within a periodic Paging_Cycle. To synchronize with the paging cycle of a BS, the MS may start to listen for the MOB_PAG-ADV message from frame number N when:

$$N \bmod \text{Paging\_Cycle} = \text{Paging\_Offset} \qquad (1)$$

Unfortunately, the frame number of each WiMAX BS may not be synchronous, meaning different BSs may have different frame numbers at any instance. This means that, according to Equation (1), the paging cycles of each BS may occur at different points in time. As a result, in the event an MS hands over from a current serving BS to a new BS (e.g., just after a paging interval of the new BS), the MS may miss a page message, resulting in increased call setup delay.

Embodiments of the present disclosure may allow a WiMAX mobile device to monitor the paging interval of a serving base station (BS) as well as a set of neighboring BSs with good signal strength or signal quality. As will be described below, monitoring the paging intervals of multiple BSs may help improve paging success rate.

Exemplary Wireless Communication System

The word "exemplary" is used herein to mean "serving as an example, instance, or illustration." Any embodiment described herein as "exemplary" is not necessarily to be construed as preferred or advantageous over other embodiments.

The techniques described herein may be used for various broadband wireless communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

One specific example of a communication system based on an orthogonal multiplexing scheme is a WiMAX system. WiMAX, which stands for the Worldwide Interoperability for Microwave Access, is a standards-based broadband wireless technology that provides high-throughput broadband connections over long distances. There are two main applications of WiMAX today: fixed WiMAX and mobile WiMAX. Fixed WiMAX applications are point-to-multipoint, enabling broadband access to homes and businesses, for example. Mobile WiMAX offers the full mobility of cellular networks at broadband speeds.

IEEE 802.16x is an emerging standard organization to define an air interface for fixed and mobile broadband wireless access (BWA) systems. These standards define at least four different physical layers (PHYs) and one media access control (MAC) layer. The OFDM and OFDMA physical layer of the four physical layers are the most popular in the fixed and mobile BWA areas respectively.

FIG. 1 illustrates an example of a wireless communication system 100 in which embodiments of the present invention may be employed. The wireless communication system 100 may be a broadband wireless communication system. The wireless communication system 100 may provide communication for a number of cells 102, each of which is serviced by a base station 104. A base station 104 may be a fixed station that communicates with user terminals 106. The base station 104 may alternatively be referred to as an access point, a Node B, or some other terminology.

FIG. 1 depicts various user terminals 106 dispersed throughout the system 100. The user terminals 106 may be fixed (i.e., stationary) or mobile. The user terminals 106 may alternatively be referred to as remote stations, access terminals, terminals, subscriber units, mobile stations, stations, user equipment, etc. The user terminals 106 may be wireless devices, such as cellular phones, personal digital assistants (PDAs), handheld devices, wireless modems, laptop computers, personal computers, etc.

A variety of algorithms and methods may be used for transmissions in the wireless communication system 100 between the base stations 104 and the user terminals 106. For example, signals may be sent and received between the base stations 104 and the user terminals 106 in accordance with OFDM/OFDMA techniques. If this is the case, the wireless communication system 100 may be referred to as an OFDM/OFDMA system.

A communication link that facilitates transmission from a base station 104 to a user terminal 106 may be referred to as a downlink 108, and a communication link that facilitates transmission from a user terminal 106 to a base station 104 may be referred to as an uplink 110. Alternatively, a downlink 108 may be referred to as a forward link or a forward channel, and an uplink 110 may be referred to as a reverse link or a reverse channel.

A cell 102 may be divided into multiple sectors 112. A sector 112 is a physical coverage area within a cell 102. Base stations 104 within a wireless communication system 100 may utilize antennas that concentrate the flow of power within a particular sector 112 of the cell 102. Such antennas may be referred to as directional antennas.

Figure 2:
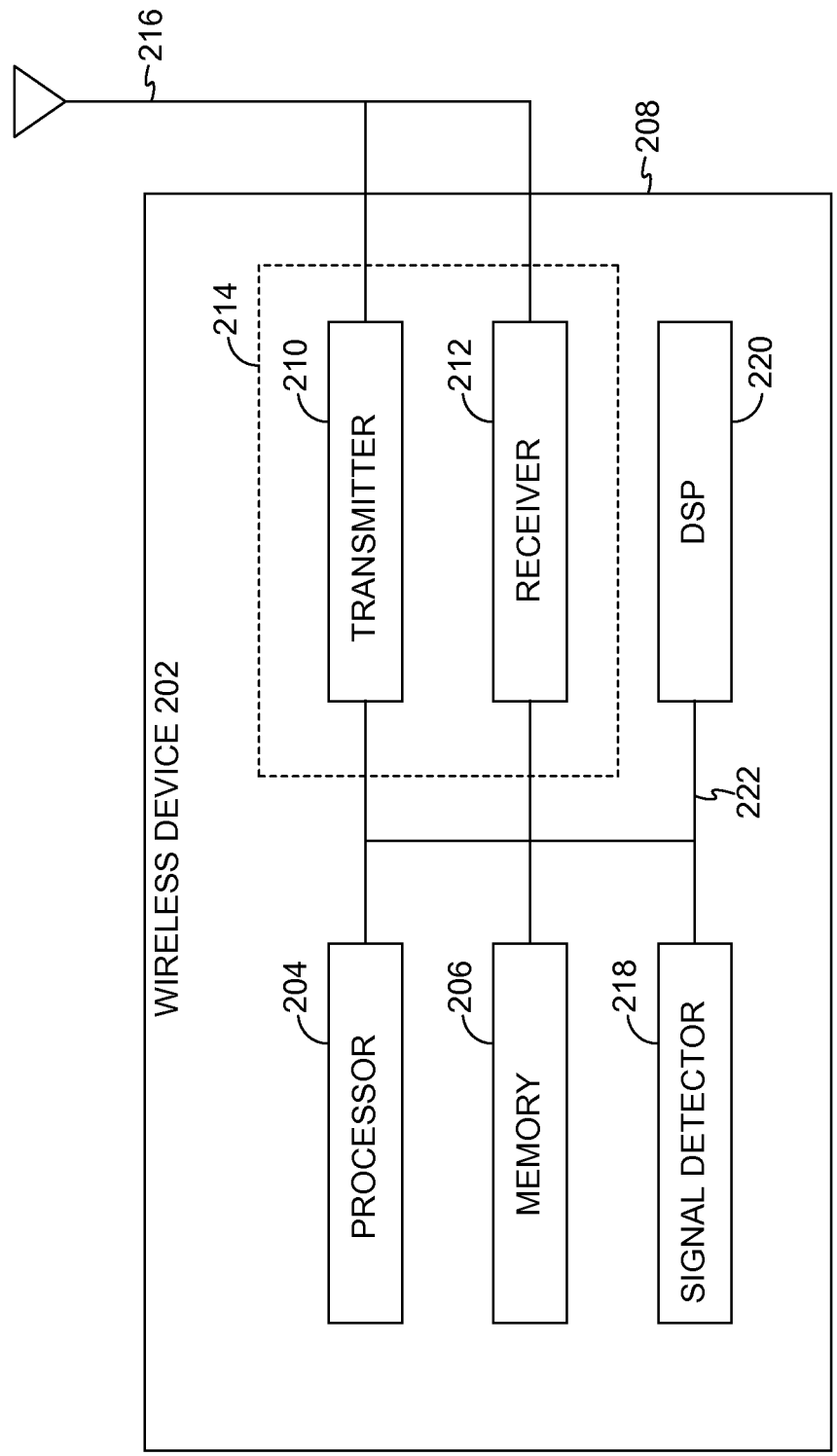
FIG. 2 illustrates various components that may be utilized in a wireless device in accordance with certain embodiments of the present disclosure.

FIG. 2 illustrates various components that may be utilized in a wireless device 202 that may be employed within the wireless communication system 100. The wireless device 202 is an example of a device that may be configured to implement the various methods described herein. The wireless device 202 may be a base station 104 or a user terminal 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, pilot energy per subcarrier and per symbol, power spectral density and other signals. The wireless device 202 may also include a digital signal processor (DSP) 220 for use in processing signals.

The various components of the wireless device 202 may be coupled together by a bus system 222, which may include a power bus, a control signal bus, and a status signal bus in addition to a data bus.

Figure 3:
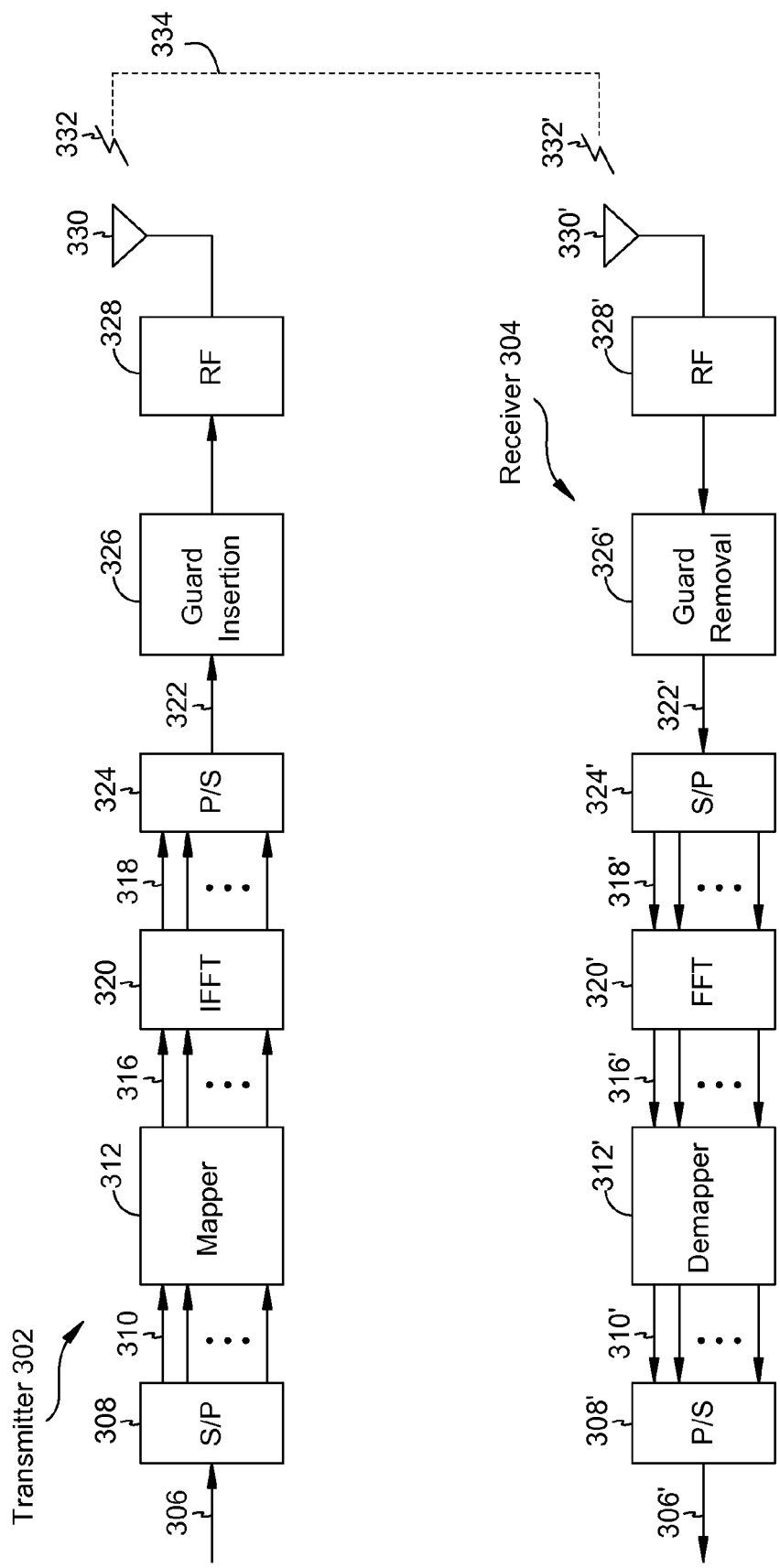
FIG. 3 illustrates an example transmitter and an example receiver in accordance with certain embodiments of the present disclosure.

FIG. 3 illustrates an example of a transmitter 302 that may be used within a wireless communication system 100 that utilizes OFDM/OFDMA. Portions of the transmitter 302 may be implemented in the transmitter 210 of a wireless device 202. The transmitter 302 may be implemented in a base station 104 for transmitting data 306 to a user terminal 106 on a downlink 108. The transmitter 302 may also be implemented in a user terminal 106 for transmitting data 306 to a base station 104 on an uplink 110.

Data 306 to be transmitted is shown being provided as input to a serial-to-parallel (S/P) converter 308. The S/P converter 308 may split the transmission data into N parallel data streams 310.

The N parallel data streams 310 may then be provided as input to a mapper 312. The mapper 312 may map the N parallel data streams 310 onto N constellation points. The mapping may be done using some modulation constellation, such as binary phase-shift keying (BPSK), quadrature phase-shift keying (QPSK), 8 phase-shift keying (8PSK), quadrature amplitude modulation (QAM), etc. Thus, the mapper 312 may output N parallel symbol streams 316, each symbol stream 316 corresponding to one of the N orthogonal subcarriers of the inverse fast Fourier transform (IFFT) 320. These N parallel symbol streams 316 are represented in the frequency domain and may be converted into N parallel time domain sample streams 318 by an IFFT component 320.

A brief note about terminology will now be provided. N parallel modulations in the frequency domain are equal to N modulation symbols in the frequency domain, which are equal to N mapping and N-point IFFT in the frequency domain, which is equal to one (useful) OFDM symbol in the time domain, which is equal to N samples in the time domain. One OFDM symbol in the time domain, Ns, is equal to Ncp (the number of guard samples per OFDM symbol)+N (the number of useful samples per OFDM symbol).

The N parallel time domain sample streams 318 may be converted into an OFDM/OFDMA symbol stream 322 by a parallel-to-serial (P/S) converter 324. A guard insertion component 326 may insert a guard interval between successive OFDM/OFDMA symbols in the OFDM/OFDMA symbol stream 322. The output of the guard insertion component 326 may then be upconverted to a desired transmit frequency band by a radio frequency (RF) front end 328. An antenna 330 may then transmit the resulting signal 332.

FIG. 3 also illustrates an example of a receiver 304 that may be used within a wireless device 202 that utilizes OFDM/OFDMA. Portions of the receiver 304 may be implemented in the receiver 212 of a wireless device 202. The receiver 304 may be implemented in a user terminal 106 for receiving data 306 from a base station 104 on a downlink 108. The receiver 304 may also be implemented in a base station 104 for receiving data 306 from a user terminal 106 on an uplink 110.

The transmitted signal 332 is shown traveling over a wireless channel 334. When a signal 332' is received by an antenna 330', the received signal 332' may be downconverted to a baseband signal by an RF front end 328'. A guard removal component 326' may then remove the guard interval that was inserted between OFDM/OFDMA symbols by the guard insertion component 326.

The output of the guard removal component 326' may be provided to an S/P converter 324'. The S/P converter 324' may divide the OFDM/OFDMA symbol stream 322' into the N parallel time-domain symbol streams 318', each of which corresponds to one of the N orthogonal subcarriers. A fast Fourier transform (FFT) component 320' may convert the N parallel time-domain symbol streams 318' into the frequency domain and output N parallel frequency-domain symbol streams 316'.

A demapper 312' may perform the inverse of the symbol mapping operation that was performed by the mapper 312 thereby outputting N parallel data streams 310'. A P/S converter 308' may combine the N parallel data streams 310' into a single data stream 306'. Ideally, this data stream 306' corresponds to the data 306 that was provided as input to the transmitter 302. Note that elements 308', 310', 312', 316', 320', 318' and 324' may all be found on a in a baseband processor 340'.

Exemplary Diversity Idle Mode in a Mobile Station

Mobile WiMAX standards define an idle mode during which a mobile station (MS) may power down components in an effort to conserve power. In the idle mode, the MS powers up components to monitor for page messages in recurring MS Paging Listening ("listening") intervals, while powering down components in MS Paging Unavailable ("sleep") intervals. During the recurring listening intervals, the MS monitors for BS Broadcast Paging (MOB_PAG-ADV) messages.

Prior to entering the idle mode, the MS may negotiate deregistration with a serving BS. During the deregistration negotiation, the MS and BS may exchange idle mode parameters, enabling the synchronization of MS listening intervals with BS paging intervals. The idle mode parameters may include, for example, a listening cycle which may be MS specific, a paging offset which may be MS specific to start listening for the MOB_PAG-ADV message, and the length of paging listening interval.

In accordance with Equation (1) above, the frame number N at which the MS may start listening for the MOB_PAG-ADV message, may be determined such that the remainder of the quotient of the frame number N divided by the number of frames in a paging cycle equals a paging offset (N mod Paging_Cycle), where the paging offset is the frame within the paging cycle in which the paging message is transmitted by the BS, according to Equation (1) above.

When a local network receives data traffic destined for an MS in idle mode, an access service network gateway (ASN-GW) may instruct all of the BSs in an associated paging group to broadcast a MOB_PAG-ADV message containing an indication the MS is being paged. Because frame numbers are not typically synchronized across BSs, the paging intervals of different BSs in the same paging group may occur at different points in time.

Unfortunately, this creates an opportunity where an MS may miss a paging message when moving from an old BS to a new BS in idle mode. For example, if the MS wakes up to find it has lost connection with a current serving BS, it may miss a page from the current serving BS. Worse, the MS may not complete the handoff procedure until after the paging interval of the new BS. Thus, the BS may miss two page messages before finally receiving a page message in a subsequent paging interval of the new BS.

Figure 4A:
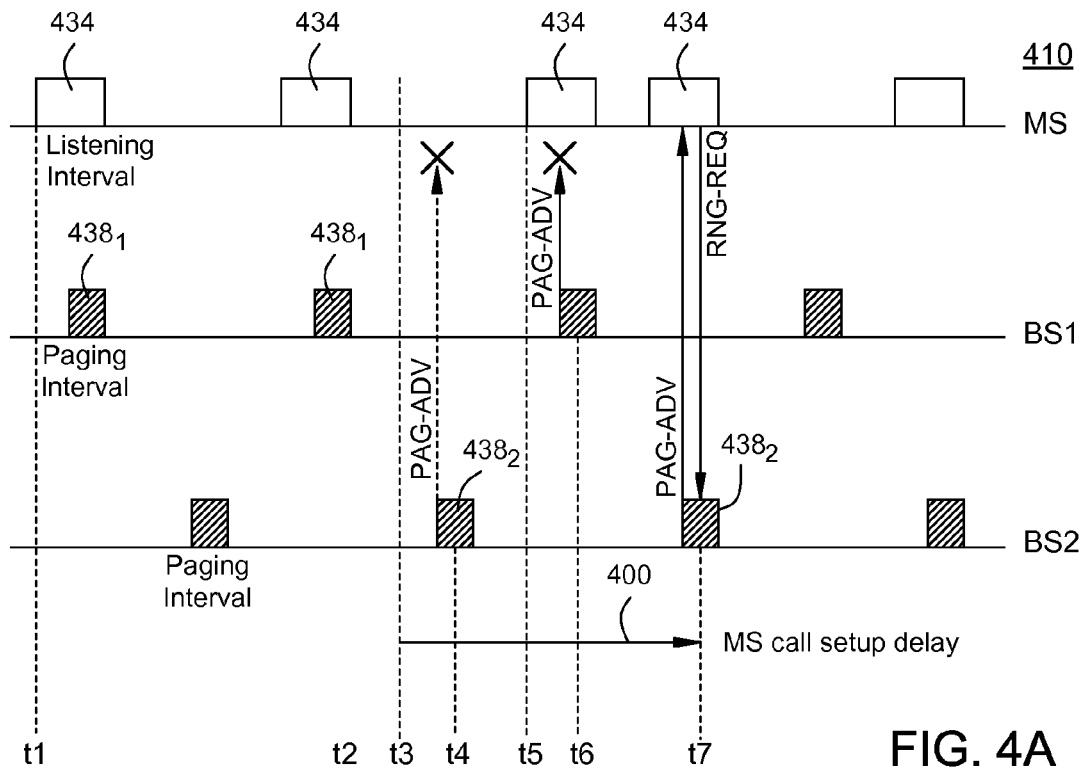
FIGS. 4A and 4B illustrate example exchanges between a mobile station in an idle mode and two base stations.

FIG. 4A illustrates such a scenario where an MS 410 moves from a current serving BS (BS1) to a new BS (BS2). The illustrated example assumes that the MS enters the idle mode at time t1. Thus, the (MS Paging) Listening Intervals 434 of the MS are aligned with the paging intervals 438₁ of BS1.

As illustrated, however, the paging intervals 438₁ of BS1 are not synchronized with the paging intervals 438₂ of BS2. Thus, in this example, when a page request arises in the network at t3, BS2 sends a MOB_PAG-ADV message before BS1. Because the MS is synchronized to BS1 and is still asleep during the paging interval 438₂ of BS2, the MS does not hear the paging message sent from BS2 (as indicated by the "X"). Further, the illustrated example also assumes that by time t5, the MS has lost connection with BS1 (e.g., the signal quality of BS1 has degraded). Therefore, when the MS wakes up at t5, it also does not hear the paging message sent from BS1 at time t6.

After detecting the loss of connection with BS1, the MS may determine (by a BS scan) that it is in the coverage area of BS2. The MS may then handoff to BS2, synchronize with the BS2 frame numbers, and finally receive a page message from BS2 at t7. As illustrated, this scenario with two missed paging messages results in a rather lengthy call setup delay 400 from the initial time t3 of the initial network page request.

Embodiments of the present disclosure, however, may help avoid this scenario and help avoid unnecessary delay in receiving and responding to paging messages by utilizing a "diversity" idle mode scanning technique for paging messages. In the "diversity idle mode," paging intervals of a group of multiple BSs may be monitored for paging messages. In the techniques presented herein, an MS may have multiple listening intervals synchronized with the paging intervals of the multiple BSs. This diversity idle mode procedure differs from the typical idle mode procedure in which an MS listens to the paging interval of a single BS.

Figure 4B:
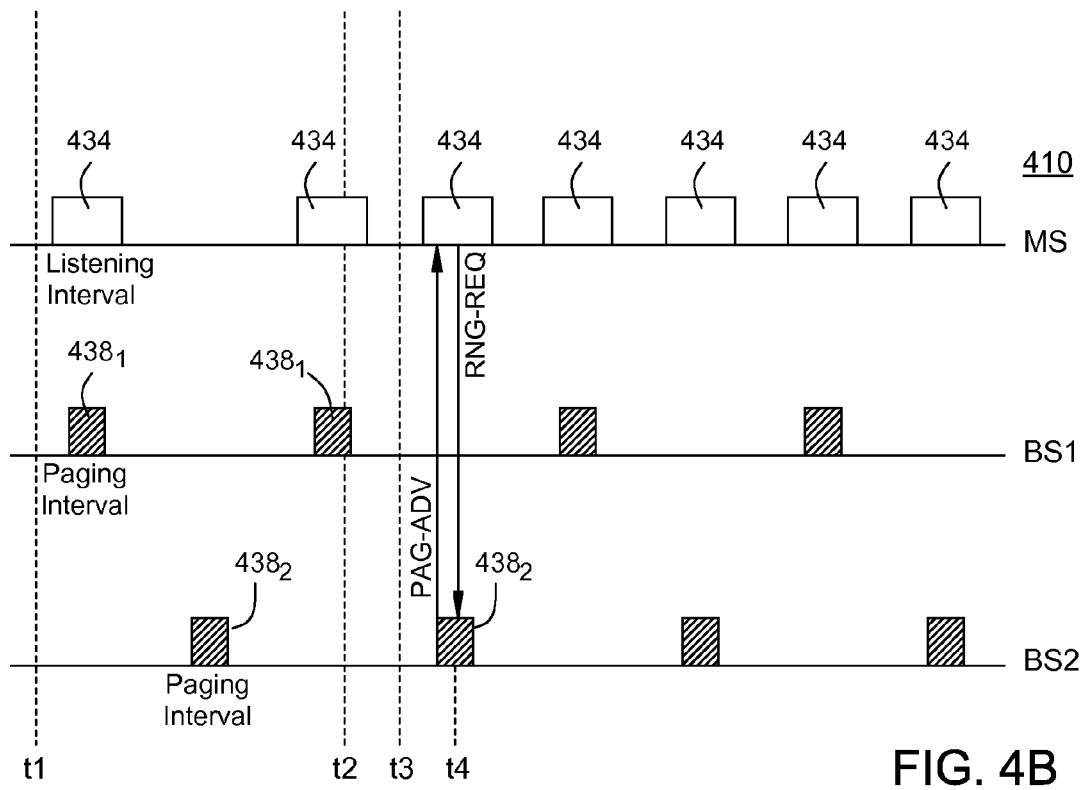
Figure 5:
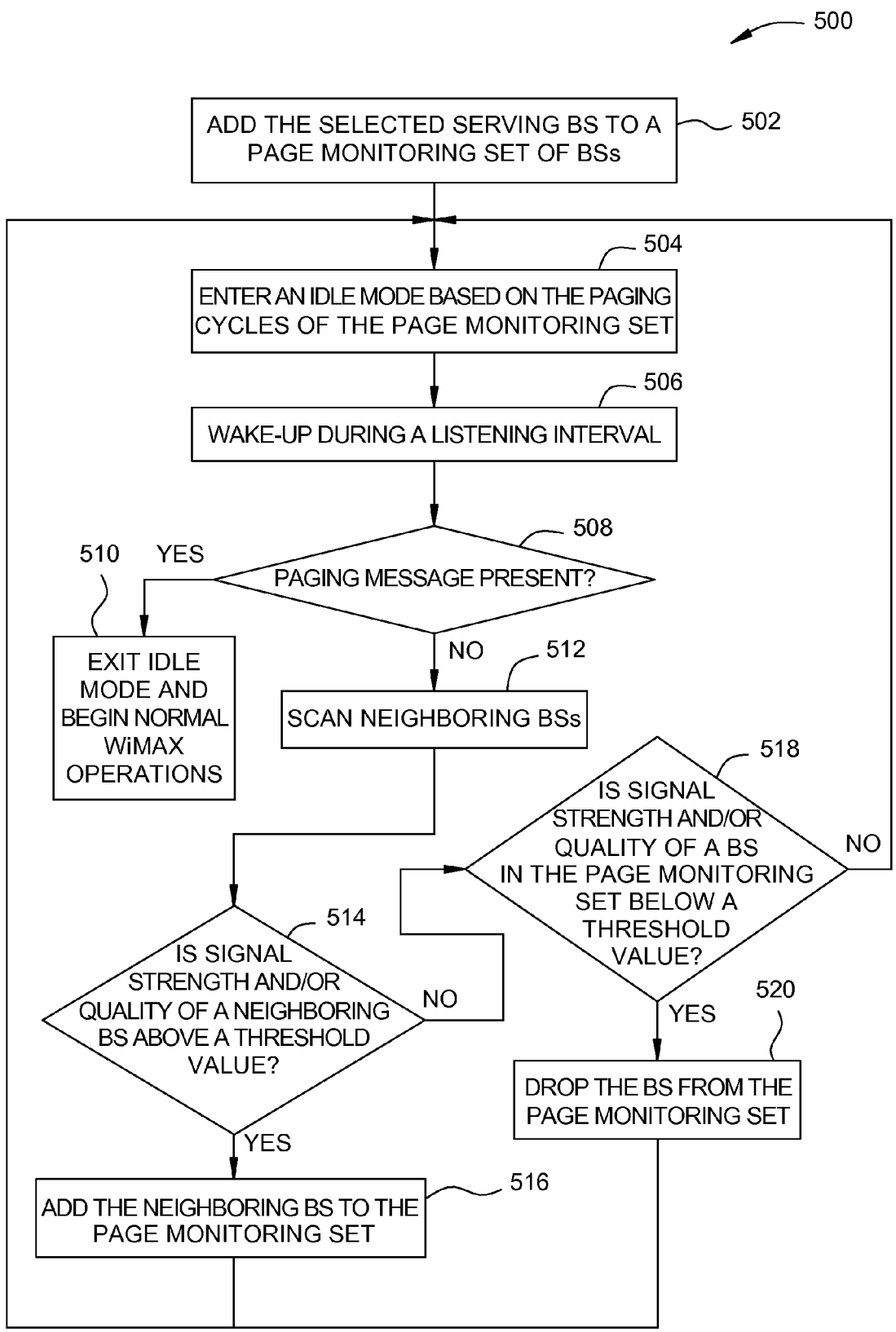
FIG. 5 illustrates example operations for proactively performing an idle mode handoff, in accordance with embodiments of the present disclosure.

FIG. 5 illustrates example operations 500 that an MS may perform for monitoring paging messages from multiple BSs in idle mode, in accordance with certain embodiments of the present disclosure. The operations may be described with reference to the example exchange of messages shown in FIG. 4B.

A "page monitoring" set of BSs to monitor for paging messages is constructed, beginning with adding a current serving BS, at 502. At 504, the idle mode is entered, based on paging cycles of BSs in the page monitoring set (initially, just the serving BS). As illustrated in FIG. 4B, at time t1, MS 410 may enter an idle mode with current serving BS1.

At 506, the MS wakes up during a listening interval to check for a paging message. If a paging message is present, as determined at 508, the MS may exit idle mode, at 510 (e.g., and begin a WiMAX data exchange).

If a paging message is not present, however, rather than go directly back to sleep, after performing standard idle mode processing in the listening interval (e.g., monitoring for a paging message from the serving BS) the MS may scan neighbor BSs, at 512. This neighbor BS scan may be performed during the listening interval or at the end of the listening interval (e.g., after determining there is no paging message from a current serving BS).

If the MS determines, at 514, that the signal strength and/or signal quality of one or more of the neighbor BSs scanned is above a threshold value, that BS may be added to the page monitoring set, at 516. Thus, the next time the MS enters the low power state of the idle mode, at 504, it will wake up according to the paging cycle of each BS in the page monitoring set, so it can listen for paging messages from each.

On the other hand, if the MS determines, at 518, that the signal strength and/or signal quality of a BS that is in the page monitoring set is below a threshold value, that BS may be dropped from the page monitoring set, at 520. Thus, the page monitoring set may be updated to limit the number of BSs monitored to those with adequate signal strength and/or quality.

This scanning for paging messages from multiple BSs in the page monitoring set is illustrated in FIG. 4B. FIG. 4B assumes that BS1 is a current serving BS and the MS determines that BS2 should be added to the page monitoring set at time t2 during (or at the end of) a listening interval 434. Thus, in addition to waking up for the paging interval 4381 of BS1, the MS will also wake up for the paging interval 4382 of BS2.

Because of this diversity idle mode, the MS may already be synchronized with BS2 in addition to BS1 when the network receives a page request at t3. As a result, the MS is able to hear the paging message sent from BS2 in the first paging interval 4382, thereby avoiding the lengthy call setup delay 400 of FIG. 4A caused by missing two page messages. The MS may reply using standing ranging procedures and proceed in accordance with the page message.

To identify neighboring BSs to scan and help speed up scanning for neighbor BSs, the MS may utilize information in a neighbor advertisement message (MOB_NBR-ADV) from the serving BS. In order to decide whether or not to add a BS to the page monitoring set, the MS may determine if the received signal strength indicator (RSSI) and/or some other signal quality parameter of a neighboring BS is greater than a selectable threshold value U_ADD. In certain embodiments, the signal quality of neighboring BSs may be determined by determining the carrier to interference ratio (CIR), carrier to noise ratio (CNR), carrier to interference plus noise ratio (CINR), or any other metric known by those skilled in the art.

In any case, when a new BS is added to page monitoring set, the MS will synchronize with the new BS's DL frame and frame number as indicated by the DL-MAP message transmitted by the new BS, so the MS will, therefore, know when to wake up to monitor for paging messages from that BS. Thus, according to the diversity idle mode presented herein, the MS needs to maintain multiple paging interval schedules, each for a BS in page monitoring set.

In addition to adding BSs to the page monitoring set, an MS may also remove BSs from the page monitoring set. For example, if the RSSI or CINR of a BS in the page monitoring set falls below a threshold value U_DROP and there is still another BS in the page monitoring set A, that BS may be dropped. For certain embodiments, a first threshold value may be used (for U_ADD) to add BSs, while a second threshold value may be used (for U_DROP) to remove BSs, to provide some degree of hysteresis which may help keep the page monitoring set from rapidly changing.

Figure 6A:
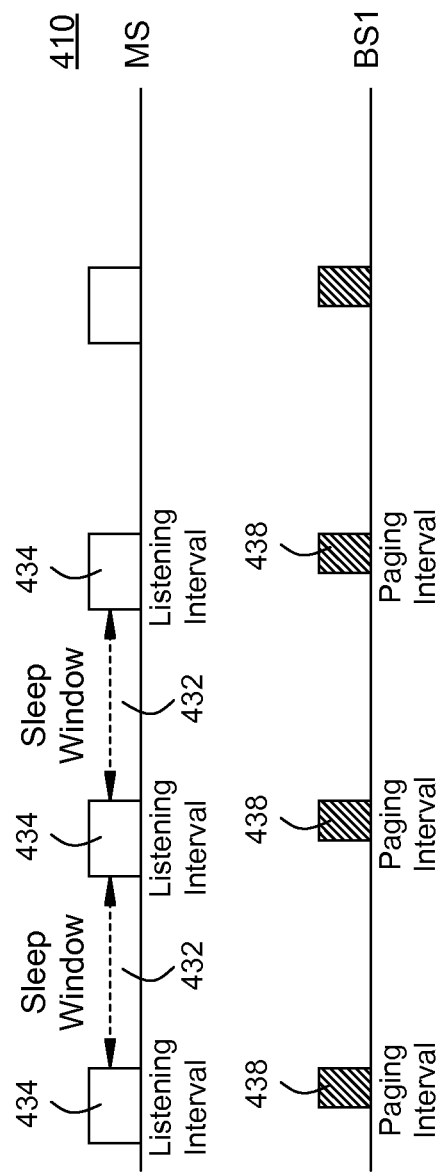
FIGS. 6A-C illustrate different techniques for monitoring paging cycles of multiple BSs.
Figure 6B:
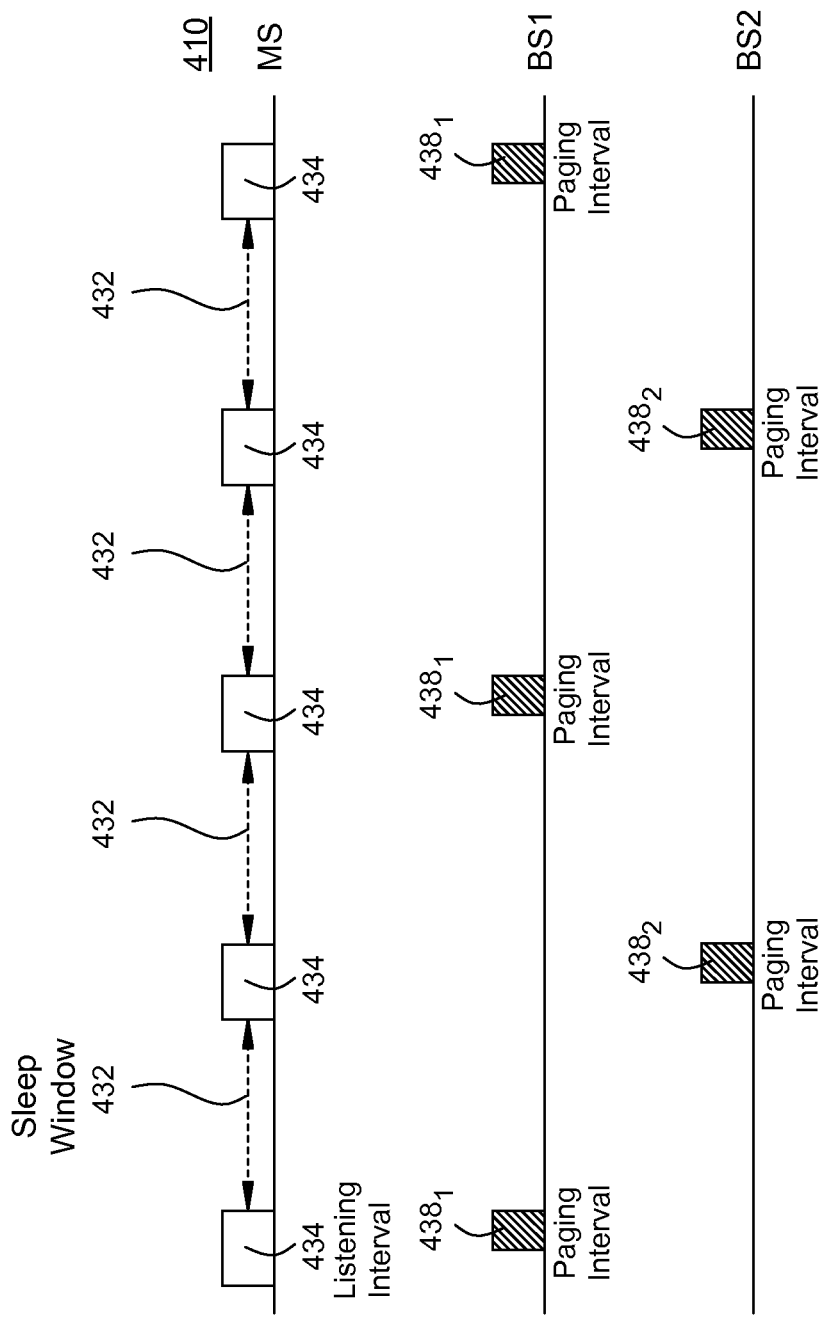
Figure 6C:
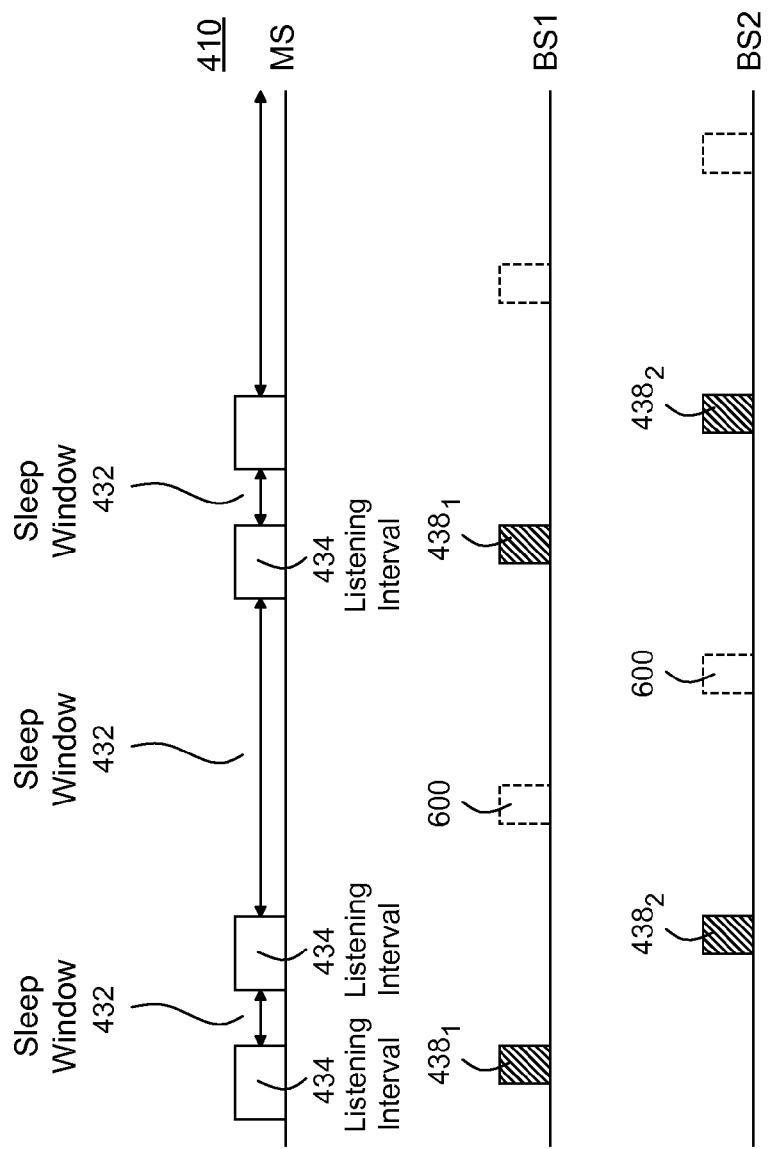

Because the total time an MS is between listening intervals (e.g., asleep with components powered down in an unavailable state) may vary depending on how many BSs are in a page monitoring set, the amount of power consumption may vary. FIGS. 6A-C illustrate example listening intervals and, thus, indirectly the power consumption of the MS 410.

FIG. 6A illustrates an MS 410 with listening intervals 434 aligned with the paging intervals 438 of a traditional, WiMAX BS paging cycle. FIG. 6B illustrates a possible increase in the power consumption of the MS 410 when monitoring the paging intervals of two BSs. As shown, the MS is powered up and listening twice as often as in FIG. 6A. For certain embodiments, however, an increase in power consumption may be mitigated.

For example, for certain embodiments, a paging cycle may be increased based on a number of base stations in the page monitoring set. For example, the duration of a paging cycle to be increased by a factor of 'M', where M is the number of BSs in the page monitoring set, to maintain the power consumption of the MS 410 (e.g., while the number of listening intervals may be increased by a factor of M, increasing the paging cycle by a factor of M may reduce the frequency of listening intervals by the same factor).

FIG. 6C illustrates an example paging cycle in which the duration has been increased by a factor of 2. When negotiating deregistration and synchronizing with the BSs of the page monitoring group, the MS 410 may account for the number of BSs in the page monitoring group by requesting an increased duration of the paging cycle. Paging intervals 600 in FIG. 6 indicate paging intervals that are not monitored by the MS and may, thus, be omitted by the BSs, as a result of the deregistration negotiation. Accordingly, by increasing the paging cycle, the power consumption of MS 410 may be maintained, despite an increase in the number of BS paging cycles being monitored.

Figure 5A:
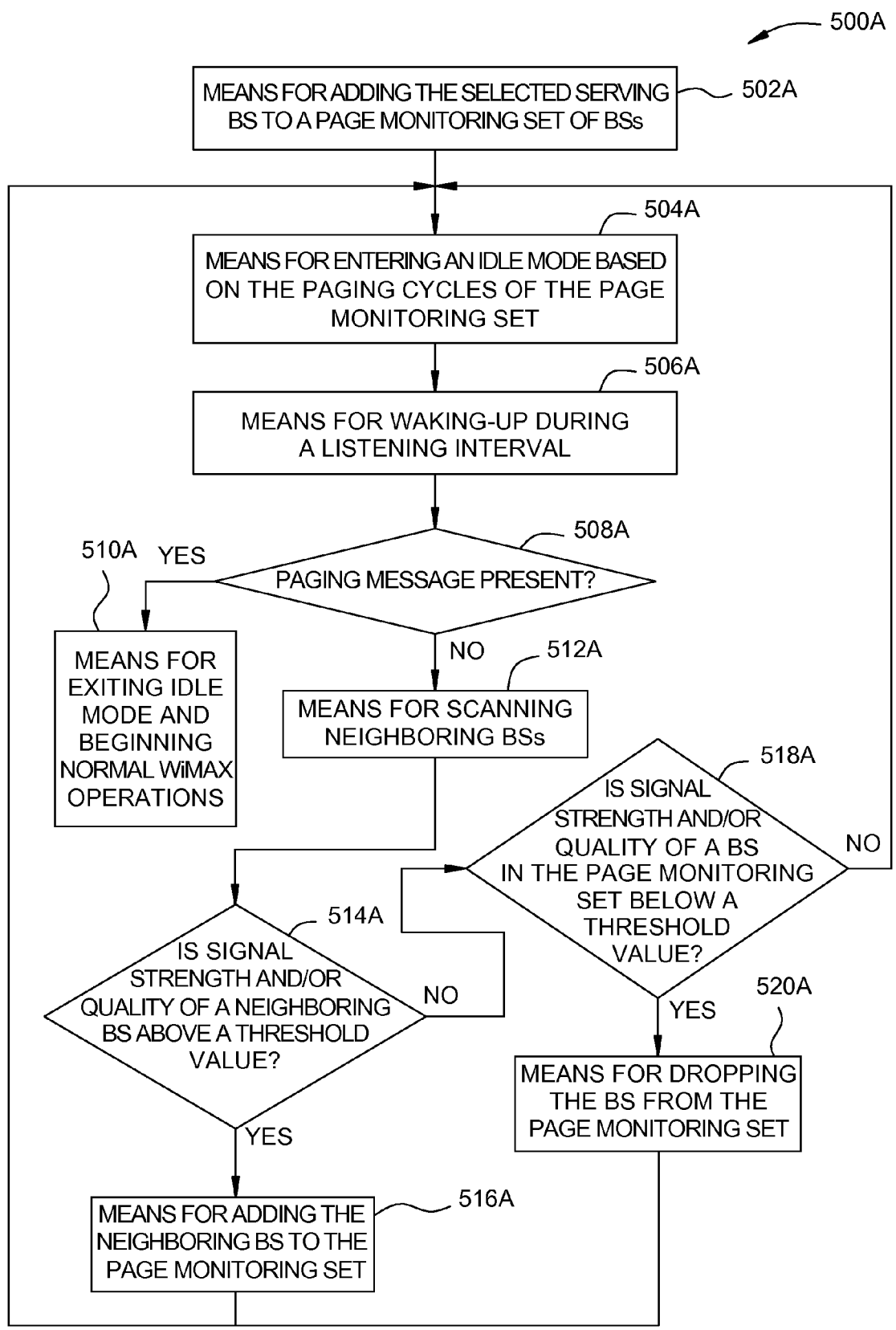
FIG. 5A is a block diagram of example components capable of performing the example operations shown in FIG. 5.

The various operations of methods described above may be performed by various hardware and/or software component(s) and/or module(s) corresponding to means-plus-function blocks illustrated in the Figures. Generally, where there are methods illustrated in Figures having corresponding counterpart means-plus-function Figures, the operation blocks correspond to means-plus-function blocks with similar numbering. For example, blocks 502-516 illustrated in FIG. 5 correspond to means-plus-function blocks 502A-516A illustrated in FIG. 5A.

The various operations of methods described above may be performed by various hardware and/or software component(s) and/or module(s) corresponding to means-plus-function blocks illustrated in the Figures. Generally, where there are methods illustrated in Figures having corresponding counterpart means-plus-function Figures, the operation blocks correspond to means-plus-function blocks with similar numbering. For example, blocks 502-518 illustrated in FIG. 5 correspond to means-plus-function blocks 502A-518A illustrated in FIG. 5A.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

Information and signals may be represented using any of a variety of different technologies and techniques. For example, data, instructions, commands, information, signals and the like that may be referenced throughout the above description may be represented by voltages, currents, electromagnetic waves, magnetic fields or particles, optical fields or particles or any combination thereof.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core or any other such configuration.

The steps of a method or algorithm described in connection with the present disclosure may be embodied directly in hardware, in a software module executed by a processor or in a combination of the two. A software module may reside in any form of storage medium that is known in the art. Some examples of storage media that may be used include RAM memory, flash memory, ROM memory, EPROM memory, EEPROM memory, registers, a hard disk, a removable disk, a CD-ROM and so forth. A software module may comprise a single instruction, or many instructions, and may be distributed over several different code segments, among different programs and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein, such as those illustrated in the Figures, can be downloaded and/or otherwise obtained by a mobile device and/or base station as applicable. For example, such a device can be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a mobile device and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to certain embodiments of the present disclosure, other and further embodiments may be devised without departing from the basic scope thereof, and the scope thereof is determined by the claims that follow.

What is claimed is:

1. A method for monitoring for paging messages by a mobile station in an idle mode in which components are powered down during paging unavailable windows, comprising:
   maintaining a page monitoring set of base stations to monitor for paging messages;
   monitoring for the paging messages from base stations in the page monitoring set during listening intervals of the idle mode, the listening intervals coordinated with paging intervals of the base stations in the page monitoring set;
   identifying an increase of at least one base station to the page monitoring set; and
   requesting an increased paging cycle for each base station in the page monitoring set in response to the identified increase of the at least one base station to the page monitoring set.

2. The method of claim 1, wherein the page monitoring set comprises at least a current serving base station and a neighboring base station.

3. The method of claim 2, wherein monitoring for paging messages from the base stations in the page monitoring set comprises:

detecting a paging message from the neighboring base station before detecting a paging message from the current serving base station.

4. The method of claim 1, wherein maintaining the page monitoring set comprises:
performing a scan of neighboring base stations; and
including, in the page monitoring set, one or more base stations having one or more receive signal quality parameters above a first threshold value.

5. The method of claim 4, wherein maintaining the page monitoring set further comprises:
removing, from the page monitoring set, one or more base stations having one or more receive signal quality parameters below a second threshold value.

6. The method of claim 4, further comprising:
identifying the neighboring base stations to scan based on information in a neighbor advertisement message (MOB_NBR-ADV) sent from the current serving base station.

7. The method of claim 1, wherein the requesting an increased paging cycle for each base station in the page monitoring set is performed when entering the idle mode.

8. An apparatus for monitoring for paging messages by a mobile station in an idle mode in which components are powered down during paging unavailable windows, comprising a processor coupled to a memory, the memory holding instructions comprising:
instructions for causing the processor to maintain a page monitoring set of base stations to monitor for paging messages; and
instructions for causing the processor to monitor for the paging messages from base stations in the page monitoring set during listening intervals of the idle mode, the listening intervals coordinated with paging intervals of the base stations in the page monitoring set;
instructions for causing the processor to identify an increase of at least one base station to the page monitoring set; and
instructions for causing the processor to request an increased paging cycle for each base station in the page monitoring set in response to the identified increase of the at least one base station to the page monitoring set.

9. The apparatus of claim 8, wherein the page monitoring set comprises at least a current serving base station and a neighboring base station.

10. The apparatus of claim 9, wherein the instructions for causing the processor to monitor for paging messages from the base stations in the page monitoring set further comprise:
instructions for causing the processor to detect a paging message from the neighboring base station before detecting a paging message from the current serving base station.

11. The apparatus of claim 8, wherein the instructions for causing the processor to maintain the page monitoring set comprise:
instructions for causing the processor to perform a scan of neighboring base stations; and
instructions for causing the processor to include in the page monitoring set, one or more base stations having one or more receive signal quality parameters above a first threshold value.

12. The apparatus of claim 11, wherein the instructions for causing the processor to maintain the page monitoring set further comprise:
instructions for causing the processor to remove from the page monitoring set one or more base stations having one or more receive signal quality parameters below a second threshold value.

13. The apparatus of claim 11, wherein the instructions further comprise:
instructions for causing the processor to identify the neighboring base stations to scan based on information in a neighbor advertisement message (MOB_NBR-ADV) sent from the current serving base station.

14. The apparatus of claim 8, wherein the instructions further comprise:
instructions for causing the processor to perform the requesting an increased paging cycle for each base station in the page monitoring set when entering the idle mode.

15. An apparatus for monitoring for paging messages by a mobile station in an idle mode in which components are powered down during paging unavailable windows, comprising:
means for maintaining a page monitoring set of base stations to monitor for paging messages;
means for monitoring for the paging messages from base stations in the page monitoring set during listening intervals of the idle mode, the listening intervals coordinated with paging intervals of the base stations in the page monitoring set;
means for identifying an increase of at least one base station to the page monitoring set; and
means for requesting an increased paging cycle for each base station in the page monitoring set in response to the identified increase of the at least one base station to the page monitoring set.

16. The apparatus of claim 15, wherein the page monitoring set comprises at least a current serving base station and a neighboring base station.

17. The apparatus of claim 16, wherein the means for monitoring for paging messages from the base stations in the page monitoring set comprises:
means for detecting a paging message from the neighboring base station before detecting a paging message from the current serving base station.

18. The apparatus of claim 15, wherein the means for maintaining the page monitoring set comprises:
means for performing a scan of neighboring base stations; and
means for including, in the page monitoring set, one or more base stations having one or more receive signal quality parameters above a first threshold value.

19. The apparatus of claim 18, wherein the means for maintaining the page monitoring set further comprises:
means for removing, from the page monitoring set, one or more base stations having one or more receive signal quality parameters below a second threshold value.

20. The apparatus of claim 18, further comprising:
means for identifying the neighboring base stations to scan based on information in a neighbor advertisement message (MOB_NBR-ADV) sent from the current serving base station.

21. The apparatus of claim 15, wherein the means for requesting an increased paging cycle for each base station in the page monitoring set operates when entering the idle mode.

22. A computer-program product for monitoring for paging messages by a mobile station in an idle mode in which components are powered down during paging unavailable windows, comprising a non-transitory computer readable storage medium having instructions stored thereon, the instructions being executable by one or more processors and the instructions comprising:

instructions for maintaining a page monitoring set of base stations to monitor for paging messages;

instructions for monitoring for the paging messages from base stations in the page monitoring set during listening intervals of the idle mode, the listening intervals coordinated with paging intervals of the base stations in the page monitoring set;

instructions for identifying an increase of at least one base station to the page monitoring set; and instructions for requesting an increased paging cycle for each base station in the page monitoring set in response to the identified increase of the at least one base station to the page monitoring set.

23. The computer-program product of claim 22, wherein the page monitoring set comprises at least a current serving base station and a neighboring base station.

24. The computer-program product of claim 23, wherein the instructions for monitoring for paging messages from the base stations in the page monitoring set comprise:

instructions for detecting a paging message from the neighboring base station before detecting a paging message from the current serving base station.

25. The computer-program product of claim 22, wherein the instructions for maintaining the page monitoring set comprise:

instructions for performing a scan of neighboring base stations; and instructions for including, in the page monitoring set, one or more base stations having one or more receive signal quality parameters above a first threshold value.

26. The computer-program product of claim 25, wherein the instructions for maintaining the page monitoring set further comprise:

instructions for removing, from the page monitoring set, one or more base stations having one or more receive signal quality parameters below a second threshold value.

27. The computer-program product of claim 25, wherein the instructions further comprise:

instructions for identifying the neighboring base stations to scan based on information in a neighbor advertisement message (MOB_NBR-ADV) sent from the current serving base station.

28. The computer-program product of claim 22, wherein the instructions for requesting an increased paging cycle for each base station in the page monitoring set are configured to operate when entering the idle mode.

\* \* \* \* \*